United States Patent [19]

Alapi et al.

[11] Patent Number: 4,575,460
[45] Date of Patent: Mar. 11, 1986

[54] PROCESS FOR PREPARING FARINACEOUS PASTA PRODUCTS

[75] Inventors: József Alapi, Budapest; László Baldaszti, Gárdony; László Gáspár; Márton Herczegh, both of Martonvásár; István Jávorka, Budapest; Ferenc Kisberk; János Klauser, both of Székesfehérvár; Antal Makk, Budapest; István Pallos, Székesfehérvár, all of Hungary

[73] Assignees: Fejer Megyei Gabonaforgalmi es Malomipari Vallalat, Székesfehérvár; Aranykalasz Mgtsz, Rackeve; MTA Mezogazdasagi Kutato Intezet, Martonvásár, all of Hungary

[21] Appl. No.: 545,143

[22] Filed: Oct. 25, 1983

[51] Int. Cl.[4] ............................ A23L 1/16; A23L 1/30
[52] U.S. Cl. ...................................... 426/72; 426/557; 426/451
[58] Field of Search ................ 426/557, 615, 451, 72

[56] References Cited

U.S. PATENT DOCUMENTS

| 4,230,735 | 10/1980 | Yoshida et al. | 426/557 |
| 4,243,689 | 1/1981 | Kokeguchi et al. | 426/557 |
| 4,243,690 | 1/1981 | Murakami et al. | 426/557 |

FOREIGN PATENT DOCUMENTS

| 474998 | 4/1968 | Japan | 426/557 |
| 5039128 | 10/1972 | Japan | 426/557 |
| 56-6255 | 2/1981 | Japan | 426/557 |
| 1584828 | 2/1981 | United Kingdom . | |

OTHER PUBLICATIONS

Journal of Food Science, vol. 45 (1980) pp. 404–405.
Cereal Chemistry, vol. 57, No. 3, 1980, pp. 203–206.

*Primary Examiner*—Raymond Jones
*Assistant Examiner*—Elizabeth A. King
*Attorney, Agent, or Firm*—Karl F. Ross; Herbert Dubno

[57] ABSTRACT

The invention relates to a process for the manufacturing of farinaceous pasta products by admixing 5 to 40% wheat grist with a waxy hybrid maize grist having a starch fraction containing at least 90% of amylopectin, kneading, shaping, cooking and/or drying the pasta product.

15 Claims, No Drawings

PROCESS FOR PREPARING FARINACEOUS PASTA PRODUCTS

This invention relates to a new process for the manufacturing of farinaceous products, particularly for the preparation of vermicelli and pastas for the cold-storage industry.

Farinaceous products—namely farinaceous foodstuffs obtained by admixing flour, water and optionally eggs and other additives used in the manufacturing of pastas and subsequent kneading, forming and optionally cooking and/or drying—must comply with a number of requirements. Thus the said pastas must have a short cooking time, a large swelling grade (expressed in the amount of water taken up during cooking), should not boil to pieces during cooking and the losses occurring during cooking must be small. The pasta must have suitable organoleptic properties; its shape, form, color, surface, structure, smell, taste and state after cooking must be satisfactory. A further requirement is storability for a long period of time.

Not only is it in the interest of commerce, but furthermore the government authorities in many countries require that the farinaceous products (pastas) comply with the abovementioned requirements to a great extent. Several attempts were made to improve the quality of pastas. Thus it is necessary to use suitable flour for the manufacturing of pastas. The flour of durum type wheats having a high gluten content proved to be much more advantageous than that of aestivum type wheats. The cultivation of durum type wheat is, however, limited by weather, soil and geographical factors and for this reason flour required for the manufacturing of farinaceous products is either expensive or even not at all available.

When grist of aestivum wheat having a low gluten content is used, the protein content of the pasta can be increased by the addition of eggs. This method is, however, accompanied by the drawback that eggs can be the source of infections,—particularly of Salmonella infections—and for this reason the use of eggs for this purpose is prohibited by the authorities of several countries.

One or more properties of pasta can be improved with the aid of certain additives. Thus lupine flour (Journal of Food Science 45, 2, 404–405), pea meal (Cereal Chemistry 57, 3, 203–206), skimmed milk (Japanese patent specification No. 55,49814) or soya meal can be used for this purpose. The said additives improve the cooking characteristics of the pasta (e.g. the cooking time is shortened). The color of the pasta can be improved by using by-products of maize starch production (British patent specification No. 1,584,828). In order to shorten the cooking period sodium hydrogen carbonate and an acid are added (Japanese patent specification No. 52,24577). The general cooking characteristics can be improved by adding sodium alginate, calcium gluconate and pot-ash (Soviet patent specification No. 315,913). The use of the said additives is, however, restricted by the fact that these properties are improved to the detriment of other ones, particularly when the additives are used to a large amount.

According to another method, the cooking period is shortened and the losses occurring during cooking are reduced by treating the crude pasta with vapor or drying the same at a high temperature above 70° C. [U.S. Pat. Nos. 4,230,735, 4,243,689 and 4,243,690; Swiss patent specification No. 473,538 and, Cereal Industry 56, 5, 394 (1979) and Supplementa Alla Gasetta Ufficuale Nr. 254, 30-9-74]. As a result of the said thermal treatment the proteins coagulate and this gives beneficial results. This process is, however, not competitive on an industrial scale because of the high energy demand.

The object of the present invention is to provide a process which is suitable for the production of pastas having high quality in spite of the above difficulties. It is a further object of the present invention to enable the manufacturing of farinaceous products of high quality without having to use duram type wheat grist and/or eggs.

It has been found that the above object can be achieved by using for the manufacturing of farinaceous products in an amount of 5–40% by weight—preferably 15–25% by weight—a meal comprising such hybrid maize grist which has a starch fraction containing at least 90%—preferably 95%—of amylopectin.

The above recognition is so much the more unaforeseen and surprising as hitherto maize flour was held to be unsuitable for the production of pasta. According to prior art [Getreide, Mehl und Brot, Vol. 33, (II) pages 299-302] a pasta which comprises maize grist does not form a coherent mass during kneading, it is a difficult to be worked up and the farinaceous products prepared therefrom do not comply with the requirements. The vermicelli obtained therefrom easily crumbles, and is broken, the cooked pasta is not sufficiently resilient and boils to pieces. According to the conclusions drawn from the prior art maize grist can only be added to the metal of durum wheat and in an amount not higher than 10%, because otherwise the cooking characteristics of the pasta are adversely and unfavorably affected.

On subjecting the applicability of maize meal to detailed studies it has been found that from the point of view of the quality of the pasta the amylopectin content of the starch fraction of maize is of particular significance. The amylopectin content prevents the disintegration of the starch particles during cooking, and consequently the starch is not washed out. It has also been found that the hybrid protein structure of maize having a high amylopectin content differs from that of other maize species. Namely in this case the starch particles are surrounded by the protein to a larger extent and in a more resilient manner.

Amylopectin which has a high molecular weight and a cross-linked structure plays in the formation of the structure of the pasta a similar role as gluten protein and ensures the coherent structure.

The amylopectin-protein structure which is indispensable and of outstanding importance from the point of view of pasta production can, however, only be formed if a hybrid maize grist is used which comprises a starch fraction containing at least 90% of amylopectin.

According to the process of the present invention it is preferred to use in the above-mentioned amount maize ground to a particle size generally used in pasta production, i.e. to 100–500 microns, preferably to 200–400 microns, particularly to 260–340 microns. The preparation of such grist does not require special equipment or technology of the milling industry. One may proceed preferably by admixing maize grist with wheat flour under dry conditions and subjecting the mixture to usual technological steps; the flour is admixed with water and optionally with eggs, egg-powder or egg-fluid, respectively and to the mass the optional additives are added. As additives e.g. phosphates or carbonates can be used which shorten the cooking period or vitamins or sodium chloride can be applied. The mass is kneaded in a suitable kneading machine, then shaped to the desired from (e.g. it is extruded to a macaroni) and if vermicelli is to be prepared it is dried. According to the process of the present invention high-temperature drying is eliminated. This step is however, necessary if pastas of some specific quality are to be prepared.

A preferable form of carrying out the process of the present invention is described below:

Wheat meal (flour) is admixed with maize grist and from the mixture thus obtained a mass containing about 30% of water is prepared by adding warm water (70° C.). The mass is kneaded homogenous and formed on a pasta press at a temperature of about 40° C. The crude pasta is dried in an air-conditioned box at 75°–80° C. A pasta which can be preserved by deep-freezing is obtained in an analogous manner. In this case the water-content of the mass is adjusted to about 40–50% and the crude pasta obtained after forming is not dried but cooked at a temperature of 90°–100° C. for about 5 minutes. The product thus obtained is packed and preserved by deep-freezing.

The pasta prepared by the above process has a nice yellow color and possesses outstanding properties. It can be cooked within a short period of time and the cooked pasta is resilient and not sticky.

The advantage of the present invention is that it provides a simple and economic, process for the production of farinaceous products of outstanding quality. According to the present invention starting from aestivum wheat grist and without the use of eggs a pasta of such quality can be prepared which could be obtained by know methods only from the grist of durum wheat or by using eggs, respectively. The cooking time of the pasta prepared by the process of the present invention is shorter than that of the product obtained by conventional methods and therefore the energy demand of the this pasta is lower. The present invention eliminates the use of eggs and this leads to the production of farinaceous products which can be stored for a long period of time and do not give rise to Salmonella infections. The cold-storage pasta products prepared according to the present invention can be readily and conveniently stored by deep-freezing. The other properties of the products obtained by the process of the present invention are excellent too as is demonstrated by the comparative experiments disclosed in the Examples.

Further details of the process are illustrated by the following Examples without limiting the scope of protection to the said Examples.

EXAMPLE 1

85 kg of aestivum wheat grist are admixed with 15 kg of waxy hybrid maize grist, the starch fraction thereof containing 99% of amylopectin. To the dry product warm water (70° C.) is added and the mixture is kneaded in a Z-armed mixer for 10 minutes. The mass is kneaded homogeneous, whereupon it is shaped in a Pavanti type pasta press at 40° C. under a pressure of 120 kg/cm$^2$. The crude pasta thus obtained is dried at 75° C. The pasta thus obtained has a nice yellow color and can be stored without any deterioration for at least a year.

EXAMPLE 2

One proceeds according to Example 1 except that a mixture of 80 mg of aestivum wheat grist and 20 kg of waxy hybrid maize grist is used. The pasta thus obtained is similar to that prepared by Example 1, it has a more intensely yellow color and can be stored for an equally long period of time.

EXAMPLE 3

One proceeds according to Example 1 except that 75 kg of aestivum wheat grist and 25 kg of waxy hybrid maize grist are used. The pasta thus obtained has a yellow color and is well storable.

EXAMPLE 4

70 kg of aestivum wheat grist are admixed with 15 kg of durum wheat grist and 15 kg of waxy hybrid maize grist. The mixture is worked up as described in Example 1. The pasta thus obtained is of a brownish yellow color and storable.

EXAMPLE 5

85 kg of aestivum wheat grist are admixed with 15 kg of waxy hybrid maize grist. The mixture is worked up as described in Example 1 except that an amount of eggs-powder corresponding to 20 eggs is added to the mass prior to homogenization.

EXAMPLE 6

75 kg of aestivum wheat grist are admixed with 25 kg of waxy hybrid maize grist. The mixture is worked up as described in Example 1 except that an amount of egg-fluid corresponding to 40 eggs is added to the mass prior to homogenization.

The characteristic properties of the pastas prepared according to the above Examples are determined and compared to those of products prepared without the addition of maize grist or by using normal maize grist, respectively, starting from aestivum or durum wheat grist, respectively, in the presence or absence of eggs, respectively. The reference pastas serving as comparison are prepared by the process according to Example 1 from the corresponding starting materials. The starch fraction of normal maize flour contains 75% of amylopectin. The tests are caried out and the results evaluated according to the corresponding Hungarian standards Nos. 11919-78, 17673-79, 20500/1-72, 20500/2-80 and 20500/3-79, respectively.

The results are summarized in Table 1. In the Table the pastes are characterized by the total number of points of the organoleptic tests which is the sum of the number of points of the following four tests: external appearance (maximal number of points: 40); smell (maximal number of points 10); taste (maximal number of point: 20); state of the cooked pasta (maximal number of points: 30).

The interval of the number of points of the organoleptic properties is disclosed, too.

TABLE I

| No. of test | 1 | 2 | 3 | 4 | 5 | 6 | 7 | 8 | 9 | 10 | 11 | 12 |
| --- | --- | --- | --- | --- | --- | --- | --- | --- | --- | --- | --- | --- |
| No. of Example | — | — | — | 1 | 2 | 3 | — | — | — | 4 | 5 | 6 |
| Aestivum TL 50 I-II grist, % | 100 | 100 | 100 | 85 | 80 | 75 | 85 | 75 | — | 70 | 85 | 75 |

TABLE I-continued

| No. of test | 1 | 2 | 3 | 4 | 5 | 6 | 7 | 8 | 9 | 10 | 11 | 12 |
|---|---|---|---|---|---|---|---|---|---|---|---|---|
| Durum meal, % | — | — | — | — | — | — | — | — | 100 | 15 | — | — |
| Waxy hybrid maize grist, % | — | — | — | 15 | 20 | 25 | — | — | — | 15 | 15 | 15 |
| Normal maize flour, % | — | — | — | — | — | — | 15 | 25 | — | — | — | — |
| Eggs (egg-powder) No. | — | 2 | 4 | — | — | — | — | — | — | — | 2 | 4 |
| Cooking time, (minutes) | 12 | 13 | 14 | 11 | 10 | 9 | 10 | 8 | 15 | 13 | 12 | 11 |
| Swelling capacity, % | 152 | 157 | 160 | 170 | 172 | 175 | 159 | 161 | 178 | 172 | 176 | 180 |
| Cooking to pieces, % | 2.5 | 1.0 | 0.5 | 0.5 | 1.0 | 1.5 | 1.5 | 2.5 | — | 0.5 | 0.5 | 1.0 |
| Cooking losses, % | 6.1 | 5.8 | 5.6 | 5.9 | 5.6 | 5.4 | 6.2 | 7.0 | 4.8 | 5.1 | 5.7 | 5.4 |
| Acid value, | 1.3–1.4 | 1.3–1.4 | 1.3–1.4 | 1.5–1.7 | 1.6–1.8 | 1.7–2.0 | 1.8–2.1 | 1.9–2.3 | 1.8–2.2 | 2.0–2.3 | 1.6–1.7 | 1.7–1.9 |
| Organoleptic properties | | | | | | | | | | | | |
| Total No. of points | 68 | 83 | 89 | 87 | 92 | 86 | 66 | 61 | 92 | 89 | 89 | 93 |
| Interval | 60–70 | 80–90 | 85–90 | 85–90 | 90–95 | 85–90 | 65–70 | 60–65 | 90–95 | 85–90 | 85–90 | 90–95 |
| Brown index Bi | 34.99 | 34.85 | 35.20 | 32.94 | 30.75 | 29.25 | 33.70 | 33.15 | 32.81 | 31.97 | 32.10 | 31.05 |
| Yellow index, Si | 15.86 | 16.77 | 18.10 | 19.93 | 22.80 | 24.80 | 17.80 | 18.85 | 18.90 | 19.03 | 20.34 | 25.45 |

It appears from Table I that some characteristic features of the pastas prepared according to the present invention are similar to those of products obtained by conventional methods while other properties are significantly superior to them. Thus the cooking time of the pasta prepared according to the present invention is shorter than that of conventional pastas and consequently they can be cooked with a smaller energy demand. The swelling capacity of the pastas according to the present invention reaches or exceeds that of conventional pastas. A further advantage of the process of the present invention is that the damages and losses occurring during cooking are significantly smaller. The highest improvement of the process of the present invention resides in the organoleptic properties and the external appearance of the pasta. It is also of great importance that starting from aestivum wheat grist being less suitable for pasta production or omitting the eggs, respectively, farinaceous products of such high quality can be obtained which could be hitherto prepared only when durum wheat grist, was used as starting material or eggs were added to the mixture.

What we claim is:

1. A process for the preparation of a farinaceous pasta product which comprises the steps of:
   (a) admixing wheat grist with a waxy hybrid maize grist, said maize grist having a starch fraction containing at least 90% of amylopectin, wherein the maize grist amounts to 5 to 40% by weight of the mixture;
   (b) adding water to the mixture formed in step (a);
   (c) kneading the mixture formed in step (b) to form a homogeneous mass; and
   (d) shaping the homogeneous mass to form the farinaceous pasta product.

2. The process defined in claim 1, wherein in step (a), the wheat grist is at least in part aestivum wheat grist.

3. The process defined in claim 1, wherein in step (a), eggs are added to form part of the mixture.

4. The process defined in claim 1, wherein in step (a), the maize grist has a starch fraction containing at least 95% amylopectin.

5. The process defined in claim 1, wherein in step (a) the maize grist amounts to 15–25% by weight of the mixture.

6. The process defined in claim 1, wherein in step (a), a phosphate or carbonate is added to the mixture in a sufficient amount to shorten the cooking time.

7. The process defined in claim 1, wherein in step (a), a vitamin or sodium chloride is added to the mixture.

8. A farinaceous pasta product prepared by the process defined in claim 1.

9. A farinaceous pasta product which comprises a mixture of wheat grist with a waxy hybrid maize grist, said maize grist having a starch fraction containing at least 90% of amylopectin, wherein the maize grist amounts to 5–40% by weight of the mixture.

10. The farinaceous pasta product defined in claim 9 wherein the wheat grist is at least in part aestivum wheat grist.

11. The farinaceous pasta product defined in claim 9 further comprising eggs.

12. The farinaceous pasta product defined in claim 9 wherein the maize grist has a starch fraction containing at least 95% amylopectin.

13. The farinaceous pasta product defined in claim 9 wherein the maize grist amounts to 15–25% by weight of the mixture.

14. The farinaceous pasta product defined in claim 9 which further comprises a phosphate or carbonate to shorten the cooking time.

15. The farinaceous pasta product defined in claim 9 which further comprises a vitamin or sodium chloride.

* * * * *